(No Model.)
L. PORTER.
RECIPROCATING CLUTCH.
No. 524,530.  Patented Aug. 14, 1894.
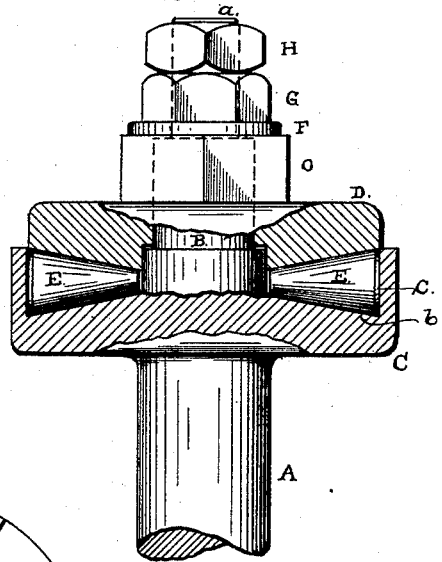
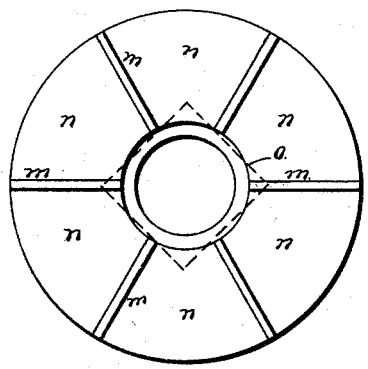
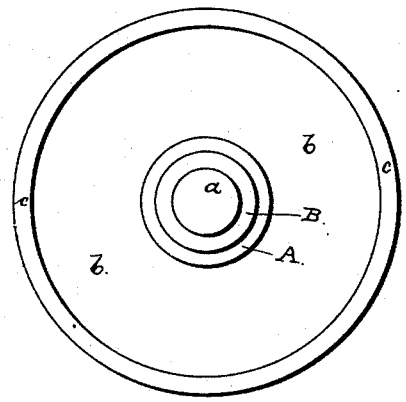
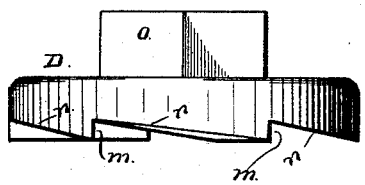
Witnesses.
Arthur B. Babbitt
Jas. H. Cunningham
Inventor
Lemuel Porter
by James R. Jenks - Atty.

UNITED STATES PATENT OFFICE.

LEMUEL PORTER, OF PROVIDENCE, RHODE ISLAND.

RECIPROCATING CLUTCH.

SPECIFICATION forming part of Letters Patent No. 524,530, dated August 14, 1894.

Application filed May 14, 1894. Serial No. 511,101. (No model.)

*To all whom it may concern:*

Be it known that I, LEMUEL PORTER, a citizen of the United States, residing at Providence, in the county of Providence and State of Rhode Island, have invented certain new and useful Improvements in Reciprocating Clutches; and I hereby declare the following to be a full, clear, and exact description of the invention, such as will enable others skilled in the art to which it appertains to make and use the same.

My invention relates to certain improvements in that class of clutch machinery usually employed in operating ratchet drills and similar mechanism, wherein the movement is forward and backward through a plane. As this movement is obtained through the medium of a lever or crank operating one of the members of the clutch, there is of necessity a very considerable amount of lost motion at the end of said lever and crank in the movement of the pawl from one tooth to another of the ratchet clutch.

The object of my invention is to overcome this objectionable feature, and to furnish a simple, efficient and inexpensive device, which shall effectually lock the clutch and hold it without slipping, and which may be instantly released, and which will immediately engage the locking device after a backward movement of the lever, without loss of motion.

My invention consists of the combination with a shaft, having a spindle extending upwardly therefrom, of a head-piece fastened upon said shaft and circumferentially cupped or channeled on its upper side, and an upper head-piece, rotatably mounted upon said spindle and adapted to be turned thereon by means of a handle, and having its under side formed in a series of radial angular recesses, and interposed between said surfaces of the head-pieces, friction rolls as hereinafter particularly specified.

In the drawings like letters indicate like parts.

Figure 1, is a view of my invention, partly in side elevation and partly in diametrical vertical section. Fig. 2, is a top plan view of the lower member. Fig. 3, is a bottom plan view of the upper member, or recessed disk. Fig. 4, is a side view of upper member. Fig. 5, is a perspective view of an intermediate conical roll.

In the drawings A is the main shaft, and B a spindle extending upwardly therefrom and provided with a screw-thread $a$.

C is a head-piece or the lower member of the clutch. It is fastened to the shaft A and has a circumferential channel $b$, the outer edge $c$ of which extends upwardly as a flange and the bottom of which is inclined at an angle upwardly from said flange or edge to the shaft, as shown in Fig. 1.

The upper member of the clutch is a head-piece D, rotatably mounted upon the spindle $a$ of the shaft A, and furnished with angularly-shaped hub $o$, upon which a handle or lever may be engaged to operate the clutch. The under side of said upper member or head-piece has formed therein a series of radial angular recesses, having the toothed shape, shown in side elevation in Fig. 4. These recesses each have a radial face $m$, extending vertically and an inclined face $n$ from one vertical face $m$ to the next in succession, as fully illustrated in said Fig. 4. These radial recesses $m$ $n$ also have the same taper or pitch downward toward the shaft A, as the lower head-piece C of the device has in its circumferential channel.

Upon the spindle $a$ is a washer F, a nut G and a check-nut H.

The intermediate members of the device are the conical rolls E, which are rotatably mounted in said radial recesses $m$, $n$, and circumferential channel $b$ of the head-pieces D, C, respectively. It is evident that they have a bearing upon the whole length of their conical surfaces at top and bottom and present a large extent of surface along the lines of contact.

When the members of the clutch are assembled and in position as seen in Fig. 1, the flange $c$, extends up over the recesses $m$, $n$, in each of which, respectively, are placed the conical rolls E. These rolls are held in constant contact between the head-pieces C, D, by the nuts G H, which can be accurately adjusted from time to time to take up all lost motion or wear.

When the clutch is turned in a forward direction to bring the rolls against the square or vertical sides of the recesses it revolves perfectly free and easy, but in starting it in the opposite direction, thereby bringing the action of the wedge-shape faces of the upper member on the rolls, it is held absolutely firm without slip or lost motion.

What I claim, and desire to secure by Letters Patent, is—

The combination in a reciprocating clutch of an upper member, having recesses, the sides of which radiate from the center, and made with inclined plane faces and also inclining to a common point in the center, a lower cup-shaped member, whose inner surface is a plane inclining on the same angle toward the center and radiating to the same point as the faces of the recesses of upper member, and intermediate members composed of conical-shaped rolls, the incline of whose surfaces corresponds to the angles of both upper and lower members and which are held between the inclined shaped faces of the upper member and the inclined surfaces of the lower member, the number of said rolls to correspond to number of recesses in upper member, substantially as described.

In testimony whereof I affix my signature in presence of two witnesses.

LEMUEL PORTER.

Witnesses:
HENRY F. JENKS,
THOMAS F. MURPHY.